US010557027B2

(12) United States Patent
Grestenberger et al.

(10) Patent No.: US 10,557,027 B2
(45) Date of Patent: *Feb. 11, 2020

(54) HIGH FLOW TPO COMPOSITION WITH EXCELLENT TENSILE STRAIN AT BREAK AND LOW POWDER STICKINESS

(71) Applicant: BOREALIS AG, Vienna (AT)

(72) Inventors: Georg Grestenberger, St. Peter in der Au (AT); Martina Sandholzer, Linz (AT)

(73) Assignee: Borealis AG, Vienna (AT)

( * ) Notice: Subject to any disclaimer, the term of this patent is extended or adjusted under 35 U.S.C. 154(b) by 41 days.

This patent is subject to a terminal disclaimer.

(21) Appl. No.: 15/773,067

(22) PCT Filed: Nov. 17, 2016

(86) PCT No.: PCT/EP2016/078026
§ 371 (c)(1),
(2) Date: May 2, 2018

(87) PCT Pub. No.: WO2017/085196
PCT Pub. Date: May 26, 2017

(65) Prior Publication Data
US 2018/0327582 A1    Nov. 15, 2018

(30) Foreign Application Priority Data

Nov. 17, 2015 (EP) .................... 15194961

(51) Int. Cl.
| | | |
|---|---|---|
| *C08L 23/12* | (2006.01) | |
| *C08L 23/16* | (2006.01) | |
| *C08K 3/34* | (2006.01) | |
| *C08F 4/6192* | (2006.01) | |
| *C08F 210/06* | (2006.01) | |
| *C08F 210/16* | (2006.01) | |

(52) U.S. Cl.
CPC .............. *C08L 23/16* (2013.01); *C08K 3/34* (2013.01); *C08L 23/12* (2013.01); *C08F 4/6192* (2013.01); *C08F 210/06* (2013.01); *C08F 210/16* (2013.01); *C08F 2500/12* (2013.01); *C08F 2500/17* (2013.01); *C08L 2207/02* (2013.01)

(58) Field of Classification Search
CPC . C08K 3/34; C08L 23/16; C08L 23/12; C08L 2207/02; C08L 23/142; C08L 2203/16; C08L 2203/202; C08L 2205/02; C08L 2308/00; C08L 2314/02; C08F 210/06; C08F 4/6465; C08F 2/001; C08F 2500/17; C08F 210/16; C08F 2500/12; C08F 4/6192; C08F 4/651; C08F 2500/26; B01B 3/441; C08J 5/18; C08J 2423/16; C08J 2323/16
See application file for complete search history.

(56) References Cited

U.S. PATENT DOCUMENTS

| | | | |
|---|---|---|---|
| 10,155,828 B2 * | 12/2018 | Grestenberger et al. ................... C08K 3/34 |
| 2013/0005902 A1 * | 1/2013 | Doshev et al. ......... | C08F 10/06 525/53 |
| 2018/0319968 A1 * | 11/2018 | Grestenberger et al. ................... C08L 23/12 |

FOREIGN PATENT DOCUMENTS

| | | |
|---|---|---|
| CA | 3000906 A1 | 5/2017 |
| CA | 3004383 A1 | 5/2017 |
| EP | 2610270 | 9/1987 |
| EP | 5791224 | 12/1992 |
| EP | 0887379 | 12/1998 |
| EP | 2551299 | 1/2013 |
| EP | 2610271 | 7/2013 |
| EP | 2610272 | 7/2013 |
| RU | 2510407 C2 | 3/2014 |
| WO | 9212182 | 7/1992 |
| WO | 9219653 | 11/1992 |
| WO | 9924478 | 5/1999 |
| WO | 9924479 | 5/1999 |
| WO | 0068315 | 5/2000 |
| WO | 200400899 | 12/2003 |
| WO | 2004111095 | 12/2004 |
| WO | 2005113672 | 12/2005 |
| WO | 2012007430 | 1/2012 |
| WO | 2013150057 | 10/2013 |
| WO | 2014023603 | 2/2014 |
| WO | 2014191211 | 12/2014 |

OTHER PUBLICATIONS

Zweifel, et al., "Coloration of Styrenic and Acrylic Polymers" Plastics Additives Handbook, 5th edition, 2001, pp. 871-873.
Notification of Transmittal of the International Search Report and Written Opinion of the International Searching Authority for Application No. PCT/EP2016/078026 dated Jan. 25, 2017, 13 pgs.
Extended European Search Report for Application No. 15194961.7-1302 dated Feb. 22, 2016, 8 pgs.
T. Hayashi, et al., "Heptad Configurational Analysis of 13C n.m.r. Spectra in Highly Isotatic Polypropylene", Polymer vol. 29 138-143 (1988).
Chujo R., et al., "Two-site Model Analysis of 13C n.m.r. of Polypropylene Polymerized by Ziegler-Natta Catalyst with External Alkoxysilane Donors", Polymer vol. 35, No. 2, pp. 339-342 (1994).
Office Action for Russian Application No. 2018121075104 dated Apr. 19, 2019, 6 pages.
Office Action for CA Application No. CA3003227 dated May 9, 2019, 4 pages.

* cited by examiner

*Primary Examiner* — Nathan M Nutter
(74) *Attorney, Agent, or Firm* — Lowenstein Sandler LLP

(57) ABSTRACT

The present invention is directed to a heterophasic propylene copolymer (HECO), a polyolefin composition (PO) comprising the heterophasic propylene copolymer (HECO), an automotive article comprising the heterophasic propylene copolymer (HECO) and/or the polyolefin composition (PO) and a process for the preparation of the polyolefin composition (PO) as well as the use of the heterophasic propylene copolymer (HECO) for improving the mechanical properties of a polyolefin composition (PO).

19 Claims, No Drawings

HIGH FLOW TPO COMPOSITION WITH EXCELLENT TENSILE STRAIN AT BREAK AND LOW POWDER STICKINESS

CROSS-REFERENCE TO RELATED APPLICATION(S)

This application is a national phase of International Application No. PCT/EP2016/078026, filed on Nov. 17, 2016, which claims the benefit of European Patent Application No. 15194961.7, filed on Nov. 17, 2015. The contents of these applications are hereby incorporated by reference in their entirety.

The present invention is directed to a heterophasic propylene copolymer (HECO), a polyolefin composition (PO) comprising the heterophasic propylene copolymer (HECO), an automotive article comprising the heterophasic propylene copolymer (HECO) and/or the polyolefin composition (PO) and a process for the preparation of the polyolefin composition (PO) as well as the use of the heterophasic propylene copolymer (HECO) for improving the mechanical properties of a polyolefin composition (PO).

Polypropylene is the material of choice in many applications as it can be tailored to specific purposes needed. For instance, heterophasic propylene copolymers (HECOs), are widely used in the automobile industry e.g. in bumper, dashboard, side trim panel, rocker panel and fender applications. Heterophasic polypropylenes contain a polypropylene matrix in which an amorphous phase is dispersed.

The injection moulding of these large automotive parts requires polymers with a low viscosity (for easy filling of the mould) but still balanced mechanical performance, particularly well-balanced stiffness and toughness and excellent tensile strain at break. Increasing the flowability usually goes along with a decrease in the molecular weight of the polymer chains. A lower molecular weight does not only result in a lower viscosity of the polymer but also alters its mechanical properties, e.g. lowers the toughness. Hence the combination of high flowability and excellent mechanics, i.e. well-balanced stiffness and toughness and excellent tensile strain at break, is not trivial to achieve.

Many attempts have been made in the art to provide polyolefin compositions comprising heterophasic propylene copolymers having the required good flowability combined with excellent balance in stiffness and toughness and excellent tensile strain at break. For instance, WO 2013150057 A1 discloses thermoplastic polyolefin compositions comprising a matrix phase and a dispersed phase. The intrinsic viscosity of the dispersed phase is rather low and consequently also the toughness of the polyolefin composition is low. WO 2005113672 A1 discloses polyolefin compositions having acceptable stiffness and toughness, but particularly for those embodiments with rather good balance in stiffness and toughness, the flowability is insufficient.

Thus, the object of the present invention is to provide a material which provides a combination of good flowability with an excellent stiffness/toughness balance and excellent tensile strain at break.

The finding of the present invention is to provide a heterophasic propylene copolymer (HECO) comprising a propylene homopolymer (HPP) and an elastomeric propylene-ethylene copolymer (E) with defined characteristics.

Accordingly the present invention is directed to heterophasic propylene copolymer (HECO) comprising a) a propylene homopolymer (HPP) having a melt flow rate $MFR_2$ (230° C.) measured according to ISO 1133 in the range of 100 to 300 g/10 min, and
b) an elastomeric propylene-ethylene copolymer (E),
wherein the heterophasic propylene copolymer (HECO)
(i) has a melt flow rate $MFR_2$ (230° C.) measured according to ISO 1133 in the range of 20 to 35 g/10 min,
(ii) comprises a xylene cold soluble (XCS) fraction in an amount from 28 to 38 wt.-%, based on the total weight of the heterophasic propylene copolymer (HECO),
wherein further the xylene cold soluble (XCS) fraction of the heterophasic propylene copolymer (HECO) has
(iii) an intrinsic viscosity (IV) in the range of 2.5 to 3.5 dl/g, and
(iv) an ethylene content (EC) of 15 to 35 wt.-% based on the total weight of the xylene cold soluble (XCS) fraction of the heterophasic propylene copolymer (HECO).

According to one embodiment of the heterophasic propylene copolymer (HECO), the propylene homopolymer (HPP) is unimodal with respect to the melt flow rate $MFR_2$ (230° C.) measured according to ISO 1133 and/or has a xylene cold soluble (XCS) content no higher than 5 wt.-%.

According to another embodiment of the heterophasic propylene copolymer (HECO), the heterophasic propylene copolymer (HECO) has an ethylene content (EC-HECO) of 7 to 15 wt.-%, based on the total weight of the heterophasic propylene copolymer (HECO).

According to yet another embodiment of the heterophasic propylene copolymer (HECO), the xylene cold soluble (XCS) fraction is unimodal with respect to the ethylene content (EC) and/or unimodal with respect to the molecular weight distribution (MWD).

According to one embodiment of the heterophasic propylene copolymer (HECO), the weight ratio of heterophasic propylene copolymer (HECO) to the polypropylene homopolymer (HPP) [HECO/HPP] is from 3.0:1.0 to 1.0:1.0.

According to one embodiment of the heterophasic propylene copolymer (HECO), the heterophasic propylene copolymer (HECO) is α-nucleated, i.e. comprises a α-nucleating agent.

According to another aspect of the present invention, a polyolefin composition (PO) is provided. The polyolefin composition (PO) comprises ≥95 wt.-%, based on the total weight of the composition, of the heterophasic copolymer (HECO), as defined herein.

According to one embodiment of the polyolefin composition (PO), the composition comprises an inorganic filler (F), preferably the filler is selected from the group consisting of talc, wollastonite, mica, chalk and mixtures thereof.

According to another embodiment of the polyolefin composition (PO), the composition has
i) a melt flow rate $MFR_2$ (230° C.) measured according to ISO 1133 in the range of 20 to 35 g/10 min, and
ii) a tensile modulus of ≥750 MPa, and/or
iii) a Charpy Notched impact strength at 23° C. of ≥30 $kJ/m^2$, and/or
iv) a tensile strain at break of ≥150%.

According to yet another embodiment of the polyolefin composition (PO), the composition has
i) a tensile modulus in the range of 750 to 1100 MPa, and/or
ii) a Charpy Notched impact strength at 23° C. in the range of 30 to 80 $kJ/m^2$, and/or
iii) a tensile strain at break in the range of 150 to 400%.

The present invention also relates to an automotive article comprising the heterophasic propylene copolymer (HECO), as defined herein, and/or the polyolefin composition (PO), as defined herein.

It is preferred that the automotive article is an exterior or interior automotive article selected from bumpers, body panels, rocker panels, side trim panels, interior trims, step assists, spoilers, fenders and dash boards.

A further aspect of the present invention relates to process for the preparation of the polyolefin composition (PO), as defined herein, by extruding the heterophasic propylene copolymer (HECO) and the optional inorganic filler (F) in an extruder.

According to one embodiment of the process, the heterophasic propylene copolymer (HECO) is obtained by producing the propylene homopolymer (HPP) in at least one reactor, transferring said propylene homopolymer (HPP) in at least one subsequent reactor, where in the presence of the propylene homopolymer (HPP) the elastomeric propylene-ethylene copolymer (E) is produced.

A further aspect of the present invention is the use of the heterophasic propylene copolymer (HECO), as defined herein, for improving the mechanical properties of a polyolefin composition (PO), wherein the improvement is achieved when the composition has
i) a melt flow rate $MFR_2$ (230° C.) measured according to ISO 1133 in the range of 20 to 35 g/10 min, and
ii) a tensile modulus of ≥750 MPa, and/or
iii) a Charpy Notched impact strength at 23° C. of ≥30 kJ/m², and/or
iv) a tensile strain at break of ≥150%.

In the following the invention will be described in more detail.

Heterophasic Propylene Copolymer (HECO)

The heterophasic propylene copolymer (HECO) of the present invention comprises
a) a propylene homopolymer (HPP) having a melt flow rate $MFR_2$ (230° C.) measured according to ISO 1133 in the range of 100 to 300 g/10 min, and
b) an elastomeric propylene-ethylene copolymer (E),
wherein the heterophasic propylene copolymer (HECO)
(i) has a melt flow rate $MFR_2$ (230° C.) measured according to ISO 1133 in the range of 20 to 35 g/10 min,
(ii) comprises a xylene cold soluble (XCS) fraction in an amount from 28 to 38 wt.-%, based on the total weight of the heterophasic propylene copolymer (HECO),
wherein further the xylene cold soluble (XCS) fraction of the heterophasic propylene copolymer (HECO) has
(iii) an intrinsic viscosity (IV) in the range of 2.5 to 3.5 dl/g, and
(iv) an ethylene content (EC) of 15 to 35 wt.-% based on the total weight of the xylene cold soluble (XCS) fraction of the heterophasic propylene copolymer (HECO).

It is apparent from the wording used for the different polymers (HECO, HPP and E) according to the present invention that they must (chemically) differ from each other. The expression "heterophasic" indicates that the matrix, i.e. the propylene homopolymer (HPP), contains (finely) dispersed inclusions being not part of the matrix and said inclusions contain the elastomeric propylene-ethylene copolymer (E). The term "inclusion" according to this invention shall preferably indicate that the matrix, i.e. the propylene homopolymer (HPP), and the inclusion, i.e. the elastomeric propylene-ethylene copolymer (E) form different phases within the heterophasic propylene copolymer (HECO), said inclusions are for instance visible by high resolution microscopy, like electron microscopy or scanning force microscopy. The final polyolefin composition (PO) comprising the matrix, i.e. the propylene homopolymer (HPP), and the elastomeric propylene-ethylene copolymer (E) as part of the heterophasic propylene copolymer (HECO) is probably of a complex structure.

Thus, the heterophasic propylene copolymer (HECO) according to this invention comprises
a) a propylene homopolymer (HPP) as matrix (M), and
b) an elastomeric propylene-ethylene copolymer (E) comprising, preferably consisting of, units derived from propylene and ethylene.

Preferably, the propylene content (PC-HECO) in the heterophasic propylene copolymer (HECO) is 85 to 93 wt.-%, more preferably 86 to 92 wt.-%, based on the total weight of the heterophasic propylene copolymer (HECO), more preferably based on the amount of the polymer components of the heterophasic propylene copolymer (HECO), yet more preferably based on the amount of the matrix (M), i.e. the propylene homopolymer (HPP), and the elastomeric propylene-ethylene copolymer (E) together. The remaining part constitutes the comonomers, preferably ethylene.

Accordingly, the comonomer content, preferably the ethylene content (EC-HECO), in the heterophasic propylene copolymer (HECO) is preferably 7 to 15 wt.-%, more preferably 8 to 14 wt.-%, based on the total weight of the heterophasic propylene copolymer (HECO), more preferably based on the amount of the polymer components of the heterophasic propylene copolymer (HECO), yet more preferably based on the amount of the matrix (M), i.e. the propylene homopolymer (HPP), and the elastomeric propylene-ethylene copolymer (E) together.

It is preferred that the propylene homopolymer (HPP) content in the heterophasic propylene copolymer (HECO) is in the range of 62 to 72 wt.-%, preferably in the range of 64 to 71 wt.-%, based on the total weight of the heterophasic propylene copolymer (HECO).

On the other hand, the elastomeric propylene-ethylene copolymer (E) content in the heterophasic propylene copolymer (HECO) is preferably in the range of 28 to 38 wt.-%, more preferably in the range of 29 to 36 wt.-%, based on the total weight of the heterophasic propylene copolymer (HECO).

It is preferred that the propylene homopolymer (HPP) is present in a specific weight ratio compared to the heterophasic propylene copolymer (HECO).

For example, the weight ratio of the heterophasic propylene copolymer (HECO) to the polypropylene homopolymer (HPP) [HECO/HPP] is from 3.0:1.0 to 1.0:1.0. Preferably, the weight ratio of the heterophasic propylene copolymer (HECO) to the polypropylene homopolymer (HPP) [HECO/HPP] is from 2.5:1.0 to 1.0:1.0, more preferably from 2.0:1.0 to 1.1:1.0, and most preferably from 1.8:1.0 to 1.1:1.0.

It is one requirement of the present invention that the heterophasic propylene copolymer (HECO) has a melt flow rate $MFR_2$ (230° C.) measured according to ISO 1133 in the range of 20 to 35 g/10 min, preferably in the range of 20 to 30 g/10 min.

The polypropylene matrix (M) of the heterophasic propylene copolymer (HECO) is a propylene homopolymer (HPP).

The expression propylene homopolymer (HPP) used in the instant invention relates to a polypropylene that consists substantially, i.e. of more than 99.7 wt.-%, still more preferably of at least 99.8 wt.-%, of propylene units. In a preferred embodiment only propylene units in the propylene homopolymer (HPP) are detectable.

Accordingly, the comonomer content of the polypropylene matrix (M), i.e. of the propylene homopolymer (HPP), is preferably equal or below 0.3 wt.-%, like not more than 0.2 wt.-%, e.g. non detectable.

It is a further requirement that the polypropylene matrix (M), i.e. of the propylene homopolymer (HPP), of the heterophasic propylene copolymer (HECO) has a relatively high melt flow $MFR_2$ (230° C.). Accordingly, it is preferred that the propylene homopolymer (HPP) of the heterophasic propylene copolymer (HECO) has a melt flow rate $MFR_2$ (230° C.) measured according to ISO 1133 in the range of 100 to 300 g/10 min, more preferably 100 to 250 g/10 min, still more preferably 110 to 200 g/10 min.

It is preferred that the propylene homopolymer (HPP) of the heterophasic propylene copolymer (HECO) is unimodal with respect to the melt flow rate $MFR_2$ (230° C.) measured according to ISO 1133.

It is preferred that the propylene homopolymer (HPP) has a specific melt flow rate $MFR_2$ (230° C.) compared to the heterophasic propylene copolymer (HECO).

For example, the melt flow rate $MFR_2$ (230° C.) of the polypropylene homopolymer (HPP) [HECO/HPP], measured according to ISO 1133, to the melt flow rate $MFR_2$ (230° C.) of the heterophasic propylene copolymer (HECO), measured according to ISO 1133, [$MFR_2$ (HPP)/$MFR_2$ (HECO)] is from 10.0:1.0 to 2.0:1.0. Preferably, the melt flow rate $MFR_2$ (230° C.) of the polypropylene homopolymer (HPP) [HECO/HPP], measured according to ISO 1133, to the melt flow rate $MFR_2$ (230° C.) of the heterophasic propylene copolymer (HECO), measured according to ISO 1133, [$MFR_2$ (HPP)/$MFR_2$ (HECO)] is from 9.0:1.0 to 3.0:1.0, more preferably from 9.0:1.0 to 4.0:1.0, and most preferably from 8.0:1.0 to 5.0:1.0.

Preferably, the xylene cold soluble content of the matrix (M), i.e. the propylene homopolymer (HPP), of the heterophasic propylene copolymer (HECO) is no higher than 5 wt.-%, more preferable no higher than 4.5 wt.-%, still more preferably no higher than 3.5 wt.-%, based on the total weight of the propylene homopolymer (HPP). Still more preferably the xylene cold soluble content of the matrix (M), i.e. the propylene homopolymer (HPP), of the heterophasic propylene copolymer (HECO) is no higher than 2.75 wt.-%, more preferable no higher than 2.5 wt.-%, based on the total weight of the propylene homopolymer (HPP).

Additionally or alternatively, the comonomer content, preferably ethylene content, of the matrix (M), i.e. the propylene homopolymer (HPP), of the heterophasic propylene copolymer (HECO) is no higher than 2 wt.-%, more preferable no higher than 1.5 wt.-%, still more preferably no higher than 1 wt.-%, based on the total weight of the propylene homopolymer (HPP). Preferably, the comonomer content, preferably ethylene content, of the matrix (M), i.e. the propylene homopolymer (HPP), of the heterophasic propylene copolymer (HECO) is no higher than 0.5 wt.-%, more preferable no higher than 0.3 wt.-%, still more preferably no higher than 0.1 wt.-%, based on the total weight of the propylene homopolymer (HPP).

In one embodiment, the propylene homopolymer (HPP) has a molecular weight (Mw) preferably between 100,000-400,000 such as from 120,000-250,000.

Additionally or alternatively, the propylene homopolymer (HPP) has a molecular weight distribution (MWD) preferably between 3-9 such as from 4-8.

One further essential component of the heterophasic propylene copolymer (HECO) is the elastomeric propylene-ethylene copolymer (E).

The elastomeric propylene-ethylene copolymer (E) comprises, preferably consists of, units derivable from (i) propylene and (ii) ethylene.

In the present invention the content of units derivable from propylene (PC) in the elastomeric propylene-ethylene copolymer (E) is preferably in the range from 65 to 85 wt.-%, more preferably 67 to 82 wt.-%, even more preferably 67 to 79 wt.-% and most preferably 67 to 75 wt.-%, based on the total weight of the elastomeric propylene-ethylene copolymer (E).

Thus, the elastomeric propylene-ethylene copolymer (E) preferably comprises units derivable from ethylene (EC) from 15 to 35 wt.-%, more preferably from 18 to 33 wt.-%, even more preferably from 21 to 33 wt.-% and most preferably from 25 to 33 wt.-%, based on the total weight of the elastomeric propylene-ethylene copolymer (E). Preferably the elastomeric propylene-ethylene copolymer (E) is an ethylene propylene non-conjugated diene monomer polymer (EPDM1) or an ethylene propylene rubber (EPR1), the latter especially preferred, with a propylene and/or ethylene content as defined in this paragraph.

It is preferred that the elastomeric propylene-ethylene copolymer (E) is unimodal with respect to the ethylene content (EC) of the xylene cold soluble (XCS) fraction of the heterophasic propylene copolymer (HECO).

In one embodiment, the elastomeric propylene-ethylene copolymer (E) preferably has an unimodal molecular weight distribution. Preferably, the elastomeric propylene-ethylene copolymer (E) has a molecular weight (Mw) preferably between 150,000-700,000 such as from 250,000-650,000.

Additionally or alternatively, the elastomeric propylene-ethylene copolymer (E) has a molecular weight distribution (MWD) preferably between 3.5-8 such as from 3.5-7.

In one embodiment, the heterophasic propylene copolymer (HECO) has a Mw (XCS) to Mw (XCU) between 1.5-3.5 such as from 2-3.

The heterophasic propylene copolymer (HECO) comprises a xylene cold soluble (XCS) fraction.

It is one requirement of the present invention that the heterophasic propylene copolymer (HECO) comprises a xylene cold soluble (XCS) fraction in an amount from 28 to 38 wt.-%, based on the total weight of the heterophasic propylene copolymer (HECO). For example, the heterophasic propylene copolymer (HECO) comprises the xylene cold soluble (XCS) fraction in an amount from 30 to 36 wt.-%, based on the total weight of the heterophasic propylene copolymer (HECO).

It is a further requirement of the present invention that the xylene cold soluble (XCS) fraction of the heterophasic propylene copolymer (HECO) comprises units derivable from ethylene (EC) from 15 to 35 wt.-%, more preferably from 18 to 33 wt.-%, even more preferably from 21 to 33 wt.-% and most preferably from 25 to 33 wt.-%, based on the total weight of the xylene cold soluble (XCS) fraction of the heterophasic propylene copolymer (HECO).

It is preferred that the xylene cold soluble (XCS) fraction of the heterophasic propylene copolymer (HECO) is unimodal with respect to the ethylene content (EC).

Additionally or alternatively, the propylene detectable in the xylene cold soluble (XCS) fraction preferably ranges from 65 to 85 wt.-%, more preferably 67 to 82 wt.-%, even more preferably 67 to 79 wt.-% and most preferably 67 to 75 wt.-%, based on the total weight of the xylene cold soluble (XCS) fraction of the heterophasic propylene copolymer (HECO).

In one embodiment of the present invention, the intrinsic viscosity (IV) of the xylene cold soluble (XCS) fraction of the heterophasic propylene copolymer (HECO) is rather high. Rather high values of intrinsic viscosity (IV) improve the toughness. Accordingly, it is appreciated that the intrinsic viscosity of the xylene cold soluble (XCS) fraction of the heterophasic propylene copolymer (HECO) is above 2.5 dl/g. On the other hand the intrinsic viscosity (IV) should be not too high otherwise the flowability is decreased. Thus, it is one further requirement of the present invention that the intrinsic viscosity of the xylene cold soluble (XCS) fraction of the heterophasic propylene copolymer (HECO) is in the range of 2.5 to 3.5 dl/g, more preferably in the range 2.5 to 3.3 dl/g.

In one embodiment, the xylene cold soluble (XCS) fraction of the heterophasic propylene copolymer (HECO) preferably has an unimodal molecular weight distribution. Preferably, the xylene cold soluble (XCS) fraction of the heterophasic propylene copolymer (HECO) has a molecular weight (Mw) preferably between 150,000-700,000 such as from 250,000-650,000.

Additionally or alternatively, the xylene cold soluble (XCS) fraction of the heterophasic propylene copolymer (HECO) has a molecular weight distribution (MWD) preferably between 3.5-8 such as from 3.5-7.

Preferably, it is desired that the heterophasic propylene copolymer (HECO) shows good toughness. Accordingly, it is appreciated that the heterophasic propylene copolymer (HECO) has a Charpy notched impact strength at +23° C. of ≥30 kJ/m², more preferably in the range of 30 to 80 kJ/m², still more preferably in the range of 40 to 75 kJ/m² and most preferably in the range of 50 to 75 kJ/m².

Additionally or alternatively, the heterophasic propylene copolymer (HECO) has a Charpy notched impact strength at −20° C. of ≥5 kJ/m², more preferably in the range of 5 to 20 kJ/m², still more preferably in the range of 5 to 18 kJ/m² and most preferably in the range of 6 to 15 kJ/m².

Additionally or alternatively, the heterophasic propylene copolymer (HECO) should have good tensile modulus. It is preferred that the tensile modulus of the heterophasic propylene copolymer (HECO) is ≥750 MPa, more preferably in the range of 750 to 1100 MPa, and most preferably of 800 to 1050 MPa.

It is preferred that the heterophasic propylene copolymer (HECO) has excellent tensile strain at break. Thus, the heterophasic propylene copolymer (HECO) preferably has a tensile strain at break of ≥150%, more preferably in the range of 150 to 400%, even more preferably of 150 to 350 MPa and most preferably in the range of 175 to 325%.

Thus, the heterophasic propylene copolymer (HECO) preferably has i) a melt flow rate $MFR_2$ (230° C.) measured according to ISO 1133 in the range of 20 to 35 g/10 min, preferably in the range of 20 to 30 g/10 min, and
ii) a tensile modulus of ≥750 MPa, more preferably in the range of 750 to 1100 MPa, and most preferably of 800 to 1050 MPa, and/or
iii) a Charpy Notched impact strength at 23° C. of ≥30 kJ/m², more preferably in the range of 30 to 80 kJ/m², still more preferably in the range of 40 to 75 kJ/m² and most preferably in the range of 50 to 75 kJ/m², and/or
iv) a tensile strain at break of ≥150%, more preferably in the range of 150 to 400%, even more preferably of 150 to 350 MPa and most preferably in the range of 175 to 325%.

In one embodiment, the heterophasic propylene copolymer (HECO) has i) a melt flow rate $MFR_2$ (230° C.) measured according to ISO 1133 in the range of 20 to 35 g/10 min, preferably in the range of 20 to 30 g/10 min, and
ii) a tensile modulus of ≥750 MPa, more preferably in the range of 750 to 1100 MPa, and most preferably of 800 to 1050 MPa, or
iii) a Charpy Notched impact strength at 23° C. of ≥30 kJ/m², more preferably in the range of 30 to 80 kJ/m², still more preferably in the range of 40 to 75 kJ/m² and most preferably in the range of 50 to 75 kJ/m², or
iv) a tensile strain at break of ≥150%, more preferably in the range of 150 to 400%, even more preferably of 150 to 350 MPa and most preferably in the range of 175 to 325%.

Alternatively, the heterophasic propylene copolymer (HECO) has i) a melt flow rate $MFR_2$ (230° C.) measured according to ISO 1133 in the range of 20 to 35 g/10 min, preferably in the range of 20 to 30 g/10 min, and
ii) a tensile modulus ≥750 MPa, more preferably in the range of 750 to 1100 MPa, and most preferably of 800 to 1050 MPa, and
iii) a Charpy Notched impact strength at 23° C. of ≥30 kJ/m², more preferably in the range of 30 to 80 kJ/m², still more preferably in the range of 40 to 75 kJ/m² and most preferably in the range of 50 to 75 kJ/m², or
iv) a tensile strain at break of ≥150%, more preferably in the range of 150 to 400%, even more preferably of 150 to 350 MPa and most preferably in the range of 175 to 325%.

Alternatively, the heterophasic propylene copolymer (HECO) has i) a melt flow rate $MFR_2$ (230° C.) measured according to ISO 1133 in the range of 20 to 35 g/10 min, preferably in the range of 20 to 30 g/10 min, and
ii) a tensile modulus ≥750 MPa, more preferably in the range of 750 to 1100 MPa, and most preferably of 800 to 1050 MPa, or
iii) a Charpy Notched impact strength at 23° C. of ≥30 kJ/m², more preferably in the range of 30 to 80 kJ/m², still more preferably in the range of 40 to 75 kJ/m² and most preferably in the range of 50 to 75 kJ/m², and
iv) a tensile strain at break of ≥150%, more preferably in the range of 150 to 400%, even more preferably of 150 to 350 MPa and most preferably in the range of 175 to 325%.

For example, the heterophasic propylene copolymer (HECO) has i) a melt flow rate $MFR_2$ (230° C.) measured according to ISO 1133 in the range of 20 to 35 g/10 min, preferably in the range of 20 to 30 g/10 min, and
ii) a tensile modulus of ≥750 MPa, more preferably in the range of 750 to 1100 MPa, and most preferably of 800 to 1050 MPa, and
iii) a Charpy Notched impact strength at 23° C. of ≥30 kJ/m², more preferably in the range of 30 to 80 kJ/m², still more preferably in the range of 40 to 75 kJ/m² and most preferably in the range of 50 to 75 kJ/m², and
iv) a tensile strain at break of ≥150%, more preferably in the range of 150 to 400%, even more preferably of 150 to 350 MPa and most preferably in the range of 175 to 325%.

Preferably, the heterophasic propylene copolymer (HECO) is α-nucleated. Even more preferred the present invention is free of β-nucleating agents. Accordingly, the α-nucleating agent is preferably selected from the group consisting of (i) salts of monocarboxylic acids and polycarboxylic acids, e.g. sodium benzoate or aluminum tert-butylbenzoate, and
(ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and (iii) salts of diesters of phosphoric acid, e.g. sodium 2,2'-methylenebis (4, 6,-di-tert-butylphenyl) phosphate or aluminium-hydroxy-bis[2,2'-methylene-bis(4,6-di-t-butyl-phenyl)phosphate], and
(iv) vinylcycloalkane polymer and vinylalkane polymer (as discussed in more detail below), and
(v) mixtures thereof.

Such additives are generally commercially available and are described, for example, in "Plastic Additives Handbook", 5th edition, 2001 of Hans Zweifel, pages 871 to 873. Preferably the heterophasic propylene copolymer (HECO) contains up to 5 wt.-%, based on the total weight of the heterophasic propylene copolymer (HECO), of the α-nucleating agent. In a preferred embodiment, the heterophasic propylene copolymer (HECO) contains not more than 200 ppm, more preferably of 1 to 200 ppm, more preferably of 5 to 100 ppm of a α-nucleating agent, in particular selected from the group consisting of dibenzylidenesorbitol (e.g. 1,3:2,4 dibenzylidene sorbitol), dibenzylidenesorbitol derivative, preferably dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, vinylcycloalkane polymer, vinylalkane polymer, and mixtures thereof.

It is especially preferred the heterophasic propylene copolymer (HECO) contains a vinylcycloalkane, like vinylcyclohexane (VCH), polymer and/or vinylalkane polymer. Preferably the vinylcycloalkane is vinylcyclohexane (VCH) polymer is introduced into the heterophasic propylene copolymer (HECO) by the BNT technology.

The instant heterophasic propylene copolymer (HECO) is preferably obtained by a specific process. Accordingly the heterophasic propylene copolymer (HECO) is preferably obtained by a sequential polymerization process where in the first reactor ($1^{st}$ R) and optionally in a second reactor ($2^{nd}$ R) the propylene homopolymer (HPP) is produced, whereas in the third reactor ($3^{rd}$ R) and optionally in a fourth reactor ($4^{th}$ R) the elastomeric propylene-ethylene copolymer (E) of the heterophasic propylene copolymer (HECO) is obtained.

In one embodiment, the heterophasic propylene copolymer (HECO) is preferably obtained by a sequential polymerization process where in the first reactor ($1^{st}$ R) the propylene homopolymer (HPP) is produced, whereas in the third reactor ($3^{rd}$ R) the elastomeric propylene-ethylene copolymer (E) of the heterophasic propylene copolymer (HECO) is obtained.

Alternatively, the heterophasic propylene copolymer (HECO) is preferably obtained by a sequential polymerization process where in the first reactor ($1^{st}$ R) and in a second reactor ($2^{nd}$ R) the propylene homopolymer (HPP) is produced, whereas in the third reactor ($3^{rd}$ R) and the fourth reactor ($4^{th}$ R) the elastomeric propylene-ethylene copolymer (E) of the heterophasic propylene copolymer (HECO) is obtained.

The term "sequential polymerization process" indicates that the heterophasic propylene copolymer (HECO) is produced in at least two reactors, preferably in three reactors or more, like four reactors, connected in series. Accordingly, the present process comprises at least a first reactor ($1^{st}$ R), an optional second reactor ($2^{nd}$ R), a third reactor ($3^{rd}$ R) and an optional fourth reactor ($4^{th}$ R). For example, the present process comprises at least a first reactor ($1^{st}$ R), a second reactor ($2^{nd}$ R), a third reactor ($3^{rd}$ R) and an optional fourth reactor ($4^{th}$ R), preferably at least a first reactor ($1^{st}$ R), a second reactor ($2^{nd}$ R), a third reactor ($3^{rd}$ R) and a fourth reactor ($4^{th}$ R). The term "polymerization reactor" shall indicate that the main polymerization takes place. Thus, in case the process consists of three or four polymerization reactors, this definition does not exclude the option that the overall process comprises for instance a pre-polymerization step in a pre-polymerization reactor. The term "consist of" is only a closing formulation in view of the main polymerization reactors.

After the first reactor ($1^{st}$ R) and optional second reactor ($2^{nd}$ R) the matrix (M), i.e. the propylene homopolymer (HPP), of the heterophasic propylene copolymer (HECO), is obtained. This matrix (M) is subsequently transferred into the third reactor ($3^{rd}$ R) and optional fourth reactor ($4^{th}$ R), preferably into the third reactor ($3^{rd}$ R) and the fourth reactor ($4^{th}$ R), in which the elastomeric propylene-ethylene copolymer (E) is produced and thus the heterophasic propylene copolymer (HECO) of the instant invention is obtained.

Preferably the weight ratio between the matrix (M), i.e. the propylene homopolymer (HPP), and the elastomeric propylene-ethylene copolymer (E) [(M)/(E)] is 85/15 to 60/40, more preferably 83/17 to below 62/38.

The first reactor ($1^{st}$ R) is preferably a slurry reactor (SR) and can be any continuous or simple stirred batch tank reactor or loop reactor operating in bulk or slurry. Bulk means a polymerization in a reaction medium that comprises of at least 60% (w/w) monomer.

According to the present invention the slurry reactor (SR) is preferably a (bulk) loop reactor (LR).

The optional second reactor ($2^{nd}$ R), the third reactor ($3^{rd}$ R) and the optional fourth reactor ($4^{th}$ R) are preferably gas phase reactors (GPR). Such gas phase reactors (GPR) can be any mechanically mixed or fluid bed reactors. Preferably the gas phase reactors (GPR) comprise a mechanically agitated fluid bed reactor with gas velocities of at least 0.2 m/sec. Thus it is appreciated that the gas phase reactor is a fluidized bed type reactor preferably with a mechanical stirrer.

Thus, in a preferred embodiment the first reactor ($1^{st}$ R) is a slurry reactor (SR), like loop reactor (LR), whereas the optional second reactor ($2^{nd}$ R), the third reactor ($3^{rd}$ R) and the optional fourth reactor ($4^{th}$ R) are gas phase reactors (GPR). Accordingly for the instant process at least two, preferably two or three or four polymerization reactors, namely a slurry reactor (SR), like loop reactor (LR), an optionally first gas phase reactor (GPR-1), a second gas phase reactor (GPR-2) and optionally a third gas phase reactor (GPR-3) connected in series are used. If needed prior to the slurry reactor (SR) a pre-polymerization reactor is placed.

In one embodiment, the second reactor ($2^{nd}$ R) can be a slurry reactor (SR). In this embodiment, the first reactor ($1^{st}$ R) and the second reactor ($2^{nd}$ R) are slurry reactors (SR) and the third reactor ($3^{rd}$ R) and the optional fourth reactor ($4^{th}$ R) are gas phase reactors (GPR).

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the heterophasic propylene copolymer (HECO), as defined above the conditions for the first reactor ($1^{st}$ R), i.e. the slurry reactor (SR), like a loop reactor (LR), may be as follows:
the temperature is within the range of 40° C. to 110° C., preferably between 60° C. and 100° C., like 68 to 95° C., the pressure is within the range of 20 bar to 80 bar, preferably between 35 bar to 70 bar, hydrogen can be added for controlling the molar mass in a manner known per se.

Subsequently, the reaction mixture from the first reactor ($1^{st}$ R) may be transferred to the optional second reactor ($2^{nd}$ R), i.e. gas phase reactor (GPR-1), whereby the conditions are preferably as follows:

the temperature is within the range of 50° C. to 130° C., preferably between 60° C. and 100° C., the pressure is within the range of 5 bar to 50 bar, preferably between 15 bar to 35 bar, hydrogen can be added for controlling the molar mass in a manner known per se.

If the first reactor ($1^{st}$ R) and the second reactor ($2^{nd}$ R) are slurry reactors, the conditions in the second reactor ($2^{nd}$ R), i.e. the slurry reactor, are preferably similar to the first reactor ($1^{st}$ R).

The condition in the third reactor ($3^{rd}$ R) and optional fourth reactor ($4^{th}$ R), preferably in the second gas phase reactor (GPR-2) and optionally in the third gas phase reactor (GPR-3), is similar to the second reactor ($2^{nd}$ R). This preferably applies in case the second reactor ($2^{nd}$ R) is a gas phase reactor (GPR-1). In this embodiment, the conditions in the second reactor ($2^{nd}$ R), i.e. the gas phase reactor (GPR-1), preferably differ from the conditions in the first reactor ($1^{st}$ R).

If the first reactor ($1^{st}$ R) and the second reactor ($2^{nd}$ R) are slurry reactors, the conditions in the third reactor ($3^{rd}$ R) and optional fourth reactor ($4^{th}$ R) are preferably as follows:

the temperature is within the range of 50° C. to 130° C., preferably between 60° C. and 100° C., the pressure is within the range of 5 bar to 50 bar, preferably between 10 bar to 35 bar, hydrogen can be added for controlling the molar mass in a manner known per se.

The residence time can vary in the three reactor zones.

In one embodiment of the process for producing the heterophasic propylene copolymer (HECO), the residence time in the first reactor ($1^{st}$ R), i.e. the slurry reactor (SR), like a loop reactor (LR), is in the range 0.2 to 4 hours, e.g. 0.3 to 1.5 hours and the residence time in the gas phase reactors will generally be 0.2 to 6.0 hours, like 0.5 to 4.0 hours.

If desired, the polymerization may be effected in a known manner under supercritical conditions in the first reactor ($1^{st}$ R), i.e. in the slurry reactor (SR), like in the loop reactor (LR), and/or as a condensed mode in the gas phase reactors (GPR).

Preferably the process comprises also a prepolymerization with the catalyst system used In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 0 to 50° C., preferably from 10 to 45° C., and more preferably from 15 to 40° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention, the heterophasic propylene copolymer (HECO), is obtained by a sequential polymerization process, as described above, in the presence of a catalyst system. It is appreciated that there are no specific restrictions regarding the catalyst system as long as a Ziegler-Natta catalyst is used. As regards catalyst systems suitable for preparing the heterophasic propylene copolymer (HECO), reference is made to e.g. WO2014/023603, EP591224, WO2012/007430, EP2610271, EP 261027 and EP2610272, which are incorporated herein by reference.

Polyolefin Composition (PO)

It is appreciated that the polyolefin composition (PO) comprises the heterophasic propylene copolymer (HECO) in an amount of ≥95 wt.-%, based on the total weight of the composition.

In one embodiment of the present invention, the polyolefin composition (PO) comprises the heterophasic propylene copolymer (HECO) in an amount of ≥96 wt.-%, based on the total weight of the composition. Preferably, the polyolefin composition (PO) comprises the heterophasic propylene copolymer (HECO) in an amount of ≥97 wt.-% or of ≥99.8 wt.-%, based on the total weight of the composition.

For example, the polyolefin composition (PO) comprises the heterophasic propylene copolymer (HECO) in an amount from 95 to 100 wt.-%, preferably from 96 to 99.8 wt.-%, based on the total weight of the composition. Preferably, the polyolefin composition (PO) comprises the heterophasic propylene copolymer (HECO) in an amount from 97 to 100 wt.-%, preferably from 97 to 99.8 wt.-%, based on the total weight of the composition.

In one embodiment, the polyolefin composition (PO) consists of the heterophasic propylene copolymer (HECO).

Optionally, the inclusions of the final polyolefin composition (PO) may also contain the inorganic filler (F); however, preferably the inorganic filler (F) forms separate inclusions within the matrix, i.e. the propylene homopolymer (HPP).

In addition to the polymer components the polyolefin composition (PO) according to the present invention may comprise an inorganic filler (F), preferably in an amount of ≤5 wt.-%, based on the total weight of the composition. It is appreciated that the inorganic filler (F) can be selected from the group consisting of talc, wollastonite, mica, chalk and mixtures thereof.

In one embodiment of the present invention, the inorganic filler (F) is talc.

The inorganic filler (F) preferably has an average particle size $d_{50}$ in the range of 0.5 to 20.0 μm, more preferably in the range of 0.5 to 15.0 μm, still more preferably in the range of 0.75 to 10.0 μm.

Typically, the inorganic filler (F) has a cutoff particle size $d_{95}$ [mass percent] of equal or below 25.0 μm, more preferably in the range from 1.5 to 17.5 μm, still more preferably in the range from 2.0 to 15.0 μm.

The polyolefin composition (PO) has a good flowability, i.e. a rather low melt flow rate. It is thus appreciated that the polyolefin composition (PO) has a melt flow rate $MFR_2$ (230° C.) measured according to ISO 1133 in the range of 20 to 35 g/10 min. More specifically, the polyolefin composition (PO) has a melt flow rate $MFR_2$ (230° C.) measured according to ISO 1133 in the range of 25 to 35 g/10 min.

It is further preferred that the polyolefin composition (PO) has an excellent stiffness/toughness balance. It is thus preferred that the polyolefin composition (PO) shows good toughness. Accordingly, it is appreciated that the polyolefin composition (PO) has a Charpy notched impact strength at +23° C. of ≥30 kJ/m², more preferably in the range of 30 to 80 kJ/m², still more preferably in the range of 40 to 75 kJ/m² and most preferably in the range of 50 to 75 kJ/m².

Additionally or alternatively, the polyolefin composition (PO) has a Charpy notched impact strength at −20° C. of ≥5 kJ/m², more preferably in the range of 5 to 20 kJ/m², still more preferably in the range of 5 to 18 kJ/m² and most preferably in the range of 6 to 15 kJ/m².

Additionally or alternatively, the polyolefin composition (PO) should have good tensile modulus. It is preferred that the tensile modulus of the polyolefin composition (PO) is ≥750 MPa, more preferably in the range of 750 to 1100 MPa, and most preferably of 800 to 1050 MPa.

It is preferred that the polyolefin composition (PO) has excellent tensile strain at break. Thus, the polyolefin composition (PO) preferably has a tensile strain at break of ≥150%, more preferably in the range of 150 to 400%, even more preferably of 150 to 350 MPa and most preferably in the range of 175 to 325%.

Thus, the polyolefin composition (PO) has
i) a melt flow rate $MFR_2$ (230° C.) measured according to ISO 1133 in the range of 20 to 35 g/10 min, preferably in the range of 20 to 30 g/10 min, and
ii) a tensile modulus of ≥750 MPa, more preferably in the range of 750 to 1100 MPa, and most preferably of 800 to 1050 MPa, and/or
iii) a Charpy Notched impact strength at 23° C. of ≥30 kJ/m², more preferably in the range of 30 to 80 kJ/m², still more preferably in the range of 40 to 75 kJ/m² and most preferably in the range of 50 to 75 kJ/m², and/or
iv) a tensile strain at break of ≥150%, more preferably in the range of 150 to 400%, even more preferably of 150 to 350 MPa and most preferably in the range of 175 to 325%.

In one embodiment, the polyolefin composition (PO) has
i) a melt flow rate $MFR_2$ (230° C.) measured according to ISO 1133 in the range of 20 to 35 g/10 min, preferably in the range of 20 to 30 g/10 min, and
ii) a tensile modulus of ≥750 MPa, more preferably in the range of 750 to 1100 MPa, and most preferably of 800 to 1050 MPa, or
iii) a Charpy Notched impact strength at 23° C. of ≥30 kJ/m², more preferably in the range of 30 to 80 kJ/m², still more preferably in the range of 40 to 75 kJ/m² and most preferably in the range of 50 to 75 kJ/m², or
iv) a tensile strain at break of ≥150%, more preferably in the range of 150 to 400%, even more preferably of 150 to 350 MPa and most preferably in the range of 175 to 325%.

Alternatively, the polyolefin composition (PO) has
i) a melt flow rate $MFR_2$ (230° C.) measured according to ISO 1133 in the range of 20 to 35 g/10 min, preferably in the range of 20 to 30 g/10 min, and
ii) a tensile modulus of ≥750 MPa, more preferably in the range of 750 to 1100 MPa, and most preferably of 800 to 1050 MPa, and
iii) a Charpy Notched impact strength at 23° C. of ≥30 kJ/m², more preferably in the range of 30 to 80 kJ/m², still more preferably in the range of 40 to 75 kJ/m² and most preferably in the range of 50 to 75 kJ/m², or
iv) a tensile strain at break of ≥150%, more preferably in the range of 150 to 400%, even more preferably of 150 to 350 MPa and most preferably in the range of 175 to 325%.

Alternatively, the polyolefin composition (PO) has
i) a melt flow rate $MFR_2$ (230° C.) measured according to ISO 1133 in the range of 20 to 35 g/10 min, preferably in the range of 20 to 30 g/10 min, and
ii) a tensile modulus of ≥750 MPa, more preferably in the range of 750 to 1100 MPa, and most preferably of 800 to 1050 MPa, or
iii) a Charpy Notched impact strength at 23° C. of ≥30 kJ/m², more preferably in the range of 30 to 80 kJ/m², still more preferably in the range of 40 to 75 kJ/m² and most preferably in the range of 50 to 75 kJ/m², and
iv) a tensile strain at break of ≥150%, more preferably in the range of 150 to 400%, even more preferably of 150 to 350 MPa and most preferably in the range of 175 to 325%.

For example, the polyolefin composition (PO) has
i) a melt flow rate $MFR_2$ (230° C.) measured according to ISO 1133 in the range of 20 to 35 g/10 min, preferably in the range of 20 to 30 g/10 min, and
ii) a tensile modulus of ≥750 MPa, more preferably in the range of 750 to 1100 MPa, and most preferably of 800 to 1050 MPa, and
iii) a Charpy Notched impact strength at 23° C. of ≥30 kJ/m², more preferably in the range of 30 to 80 kJ/m², still more preferably in the range of 40 to 75 kJ/m² and most preferably in the range of 50 to 75 kJ/m², and
iv) a tensile strain at break of ≥150%, more preferably in the range of 150 to 400%, even more preferably of 150 to 350 MPa and most preferably in the range of 175 to 325%.

For preparing the polyolefin composition (PO), a conventional compounding or blending apparatus, e.g. a Banbury mixer, a 2-roll rubber mill, Buss-co-kneader or a twin screw extruder may be used. The polyolefin composition (PO) recovered from the extruder is usually in the form of pellets. These pellets are then preferably further processed, e.g. by injection moulding to generate articles and products of the inventive polyolefin composition (PO).

Accordingly, the present invention is also directed to a process for the preparation of the polyolefin composition (PO) comprising the steps of adding the heterophasic propylene copolymer (HECO) and optionally the inorganic filler (F) to an extruder (as mentioned above) and extruding the same obtaining thereby said polyolefin composition (PO).

It is preferred that the heterophasic propylene copolymer (HECO) is obtained by producing the propylene homopolymer (HPP) in at least one reactor, e.g. two reactors, transferring said propylene homopolymer (HPP) in at least one subsequent reactor, e.g. two reactors, where in the presence of the propylene homopolymer (HPP) the elastomeric propylene-ethylene copolymer (E) is produced.

The polyolefin composition (PO) according to the invention may be pelletized and compounded using any of the variety of compounding and blending methods well known and commonly used in the resin compounding art.

Automotive Articles and Uses According to the Invention

It is appreciated that the instant heterophasic propylene copolymer (HECO) provides a combination of good flowability with an excellent stiffness/toughness balance and excellent tensile strain at break, preferably to polyolefin compositions prepared therefrom.

Accordingly, it is to be noted that molded articles prepared from the heterophasic propylene copolymer (HECO) and/or the polyolefin composition (PO) show a good flowability with an excellent stiffness/toughness balance and excellent tensile strain at break.

Thus, according to another aspect of the present invention, the use of the heterophasic propylene copolymer (HECO), as defined herein, for improving the mechanical properties of a polyolefin composition (PO) is provided, wherein the improvement is achieved when the polyolefin composition (PO) has i) a melt flow rate $MFR_2$ (230° C.) measured according to ISO 1133 in the range of 20 to 35 g/10 min, and ii) a tensile modulus of ≥750 MPa, and/or iii) a Charpy Notched impact strength at 23° C. of ≥30 kJ/m$^2$, and/or iv) a tensile strain at break of ≥150%.

In one embodiment, the improvement is achieved when the polyolefin composition (PO) has i) a melt flow rate $MFR_2$ (230° C.) measured according to ISO 1133 in the range of 20 to 35 g/10 min, and ii) a tensile modulus of ≥750 MPa, or iii) a Charpy Notched impact strength at 23° C. of ≥30 kJ/m$^2$, or iv) a tensile strain at break of ≥150%.

Preferably, the improvement is achieved when the polyolefin composition (PO) has i) a melt flow rate $MFR_2$ (230° C.) measured according to ISO 1133 in the range of 20 to 35 g/10 min, and ii) a tensile modulus of ≥750 MPa, and iii) a Charpy Notched impact strength at 23° C. of ≥30 kJ/m$^2$, and iv) a tensile strain at break of ≥150%.

With regard to the definition of the heterophasic propylene copolymer (HECO), the polyolefin composition (PO) and preferred embodiments thereof, reference is made to the statements provided above when discussing the technical details of the heterophasic propylene copolymer (HECO) and the polyolefin composition (PO).

The heterophasic propylene copolymer (HECO) and/or the polyolefin composition (PO) is/are preferably part of an automotive article, preferably a (injection) molded automotive article, i.e. of (interior or exterior) automotive article. For example, the heterophasic propylene copolymer (HECO) and/or the polyolefin composition (PO) is/are part of a composition, which is in turn part of the automotive article, preferably (injection) molded automotive article, i.e. of (interior or exterior) automotive article.

It is especially preferred that the heterophasic propylene copolymer (HECO) is part of the polyolefin composition (PO), which is in turn part of the automotive article, preferably (injection) molded automotive article, i.e. of (interior or exterior) automotive article.

In view of the very good results obtained, the present invention is not only directed to the heterophasic propylene copolymer (HECO) and/or the polyolefin composition (PO), but also to an automotive article in which the heterophasic propylene copolymer (HECO) and/or the polyolefin composition (PO) is part of it.

Accordingly the present invention is additionally directed to an automotive article, comprising the heterophasic propylene copolymer (HECO) and/or the polyolefin composition (PO).

Preferably, the automotive article comprises the polyolefin composition (PO), said polyolefin composition (PO) comprises, preferably consists of, the heterophasic propylene copolymer (HECO) comprising a) a propylene homopolymer (HPP) having a melt flow rate $MFR_2$ (230° C.) measured according to ISO 1133 in the range of 100 to 300 g/10 min, and b) an elastomeric propylene-ethylene copolymer (E), wherein the heterophasic propylene copolymer (HECO)

(i) has a melt flow rate $MFR_2$ (230° C.) measured according to ISO 1133 in the range of 20 to 35 g/10 min, (ii) comprises a xylene cold soluble (XCS) fraction in an amount from 28 to 38 wt.-%, based on the total weight of the heterophasic propylene copolymer (HECO), wherein further the xylene cold soluble (XCS) fraction of the heterophasic propylene copolymer (HECO) has (iii) an intrinsic viscosity (IV) in the range of 2.5 to 3.5 dl/g, and (iv) an ethylene content (EC) of 15 to 35 wt.-% based on the total weight of the xylene cold soluble (XCS) fraction of the heterophasic propylene copolymer (HECO).

The term "automotive article" used in the instant invention indicates that it is a formed three-dimensional article for the interior or exterior of automotives. Typical automotive articles are bumpers, body panels, rocker panels, side trim panels, interior trims, step assists, spoilers, fenders, dash boards and the like. The term "exterior" indicates that the article is not part of the car interior but part of the car's exterior. Accordingly, preferred exterior automotive articles are selected from the group consisting of bumpers, side trim panels, step assists, body panels, fenders and spoilers. In contrast thereto, the term "interior" indicates that the article is part of the car interior but not part of the car's exterior. Accordingly, preferred interior automotive articles are selected from the group consisting of rocker panels, dash boards and interior trims.

Preferably the automotive article, i.e. the exterior or interior automotive article, comprises equal or more than 50.0 wt.-%, more preferably equal or more than 55.0 wt.-%, yet more preferably equal or more than 70.0 wt.-%, still more preferably equal or more than 80.0 wt.-%, still yet more preferably consists of the heterophasic propylene copolymer (HECO) and/or the polyolefin composition (PO).

In one embodiment, the automotive article, i.e. the exterior or interior automotive article, comprises equal or more than 80.0 wt.-%, more preferably equal or more than 90.0 wt.-%, yet more preferably equal or more than 95.0 wt.-%, still more preferably equal or more than 99.0 wt.-%, still yet more preferably consists of the heterophasic propylene copolymer (HECO) and/or the polyolefin composition (PO).

For mixing the individual components of the instant polyolefin composition (PO), a conventional compounding or blending apparatus, e.g. a Banbury mixer, a 2-roll rubber mill, Buss-co-kneader or a twin screw extruder may be used. The polymer materials recovered from the extruder are usually in the form of pellets. These pellets are then preferably further processed, e.g. by injection molding to generate the articles, i.e. the (interior or exterior) automotive articles.

The present invention will now be described in further detail by the examples provided below.

EXAMPLES

A. Measuring Methods

The following definitions of terms and determination methods apply for the above general description of the invention as well as to the below examples unless otherwise defined.

Calculation of Comonomer Content of the Second Fraction (F2):

$$\frac{C(R2) - w(F1) \times C(F1)}{w(F2)} = C(F2)$$

wherein

| | |
|---|---|
| w(F1) | is the weight fraction of the first fraction (F1), i.e. the product of the first reactor (R1), |
| w(F2) | is the weight fraction of the second fraction (F2), i.e. of the polymer produced in the second reactor (R2), |
| C(F1) | is the comonomer content [in wt.-%] of the first fraction (F1), i.e. of the product of the first reactor (R1), |
| C(R2) | is the comonomer content [in wt.-%] of the product obtained in the second reactor (R2), i.e. the mixture of the first fraction (F1) and the second fraction (F2), |
| C(F2) | is the calculated comonomer content [in wt.-%] of the second fraction (F2). |

Calculation of the Xylene Cold Soluble (XCS) Content of the Second Fraction (F2):

$$\frac{XS(R2) - w(F1) \times XS(F1)}{w(F2)} = XS(F2)$$

wherein

| | |
|---|---|
| w(F1) | is the weight fraction of the first fraction (1), i.e. the product of the first reactor (R1), |
| w(F2) | is the weight fraction of the second fraction (F2), i.e. of the polymer produced in the second reactor (R2), |
| XS(F1) | is the xylene cold soluble (XCS) content [in wt.-%] of the first fraction (F1), i.e. of the product of the first reactor (R1), |
| XS(R2) | is the xylene cold soluble (XCS) content [in wt.-%] of the product obtained in the second reactor (R2), i.e. the mixture of the first fraction (F1) and the second fraction (F2), |
| XS(F2) | is the calculated xylene cold soluble (XCS) content [in wt.-%] of the second fraction (F2). |

Calculation of Melt Flow Rate $MFR_2$ (230° C.) of the Second Fraction (F2):

$$MFR(F2) = 10^{\left[\frac{\log(MFR(R2)) - w(F1) \times \log(MFR(F1))}{w(F2)}\right]}$$

wherein

| | |
|---|---|
| w(F1) | is the weight fraction of the first fraction (F1), i.e. the product of the first reactor (R1), |
| w(F2) | is the weight fraction of the second fraction (F2), i.e. of the polymer produced in the second reactor (R2), |
| MFR(F1) | is the melt flow rate $MFR_2$ (230° C.) [in g/10 min] of the first fraction (F1), i.e. of the product of the first reactor (R1), |
| MFR(R2) | is the melt flow rate $MFR_2$ (230° C.) [in g/10 min] of the product obtained in the second reactor (R2), i.e. the mixture of the first fraction (F1) and the second fraction (F2), |
| MFR(F2) | is the calculated melt flow rate $MFR_2$ (230° C.) [in g/10 min] of the second fraction (F2). |

Calculation of Comonomer Content of the Third Fraction (F3):

$$\frac{C(R3) - w(R2) \times C(R2)}{w(F3)} = C(F3)$$

wherein

| | |
|---|---|
| w(R2) | is the weight fraction of the second reactor (R2), i.e. the mixture of the first fraction (1) and the second fraction (F2), |
| w(F3) | is the weight fraction of the third fraction (F3), i.e. of the polymer produced in the third reactor (R3), |
| C(R2) | is the comonomer content [in wt.-%] of the product of the second reactor (R2), i.e. of the mixture of the first fraction (F1) and second fraction (F2), |
| C(R3) | is the comonomer content [in wt.-%] of the product obtained in the third reactor (R3), i.e. the mixture of the first fraction (F1), the second fraction (F2), and the third fraction (F3), |
| C(F3) | is the calculated comonomer content [in wt.-%] of the third fraction (F3). |

Calculation of Xylene Cold Soluble (XCS) Content of the Third Fraction (F3):

$$\frac{XS(R3) - w(R2) \times CS(R2)}{w(F3)} = XS(F3)$$

wherein

| | |
|---|---|
| w(R2) | is the weight fraction of the second reactor (R2), i.e. the mixture of the first fraction (F1) and the second fraction (F2), |
| w(F3) | is the weight fraction of the third fraction (F3), i.e. of the polymer produced in the third reactor (R3), |
| XS(R2) | is the xylene cold soluble (XCS) content [in wt.-%] of the product of the second reactor (R2), i.e. of the mixture of the first fraction (F1) and second fraction (F2), |
| XS(R3) | is the xylene cold soluble (XCS) content [in wt.-%] of the product obtained in the third reactor (R3), i.e. the mixture of the first fraction (F1), the second fraction (F2), and the third fraction (F3), |
| XS(F3) | is the calculated xylene cold soluble (XCS) content [in wt.-%] of the third fraction (F3). |

Calculation of melt flow rate $MFR_2$ (230° C.) of the third fraction (F3):

$$MFR(F3) = 10^{\left[\frac{\log(MFR(R3)) - w(R2) \times \log(MFR(R2))}{w(F3)}\right]}$$

wherein

| | |
|---|---|
| w(R2) | is the weight fraction of the second reactor (R2), i.e. the mixture of the first fraction (F1) and the second fraction (F2), |
| w(F3) | is the weight fraction of the third fraction (F3), i.e. of the polymer produced in the third reactor (R3), |
| MFR(R2) | is the melt flow rate $MFR_2$ (230° C.) [in g/10 min] of the product of the second reactor (R2), i.e. of the mixture of the first fraction (F1) and second fraction (F2), |

-continued

| MFR(R3) | is the melt flow rate $MFR_2$ (230° C.) [in g/10 min] of the product obtained in the third reactor (R3), i.e. the mixture of the first fraction (F1), the second fraction (F2), and the third fraction (F3), |
|---|---|
| MFR(F3) | is the calculated melt flow rate $MFR_2$ (230° C.) [in g/10 min] of the third fraction (F3). |

Calculation of Comonomer Content of the Fourth Fraction (F4):

$$\frac{C(R4) - w(R3) \times C(R3)}{w(F4)} = C(F4)$$

wherein

| w(R3) | is the weight fraction of the third reactor (R3), i.e. the mixture of the first fraction (F1), the second fraction (F2) and the fourth fraction (F3), |
|---|---|
| w(F4) | is the weight fraction of the fourth fraction (F4), i.e. of the polymer produced in the fourth reactor (R4), |
| C(R3) | is the comonomer content [in wt.-%] of the product of the third reactor (R3), i.e. of the mixture of the first fraction (F1), the second fraction (F2) and the third fraction (F3), |
| C(R4) | is the comonomer content [in wt.-%] of the product obtained in the fourth reactor (R4), i.e. the mixture of the first fraction (F1), the second fraction (F2), the third fraction (F3) and the fourth fraction (F4), |
| C(F4) | is the calculated comonomer content [in wt.-%] of the fourth fraction (F4). |

Calculation of Xylene Cold Soluble (XCS) Content of the Fourth Fraction (F4):

$$\frac{XS(R4) - w(R3) \times XS(R3)}{w(F4)} = XS(F4)$$

wherein

| w(R3) | is the weight fraction of the third reactor (R3), i.e. the mixture of the first fraction (F1), the second fraction (F2) an the third fraction (F3), |
|---|---|
| w(F4) | is the weight fraction of the fourth fraction (F4), i.e. of the polymer produced in the fourth reactor (R4), |
| XS(R3) | is the xylene cold soluble (XCS) content [in wt.-%] of the product of the third reactor (R3), i.e. of the mixture of the first fraction (F1), the second fraction (F2) and the third fraction (F3), |
| XS(R4) | is the xylene cold soluble (XCS) content [in wt.-%] of the product obtained in the fourth reactor (R4), i.e. the mixture of the first fraction (F1), the second fraction (F2), the third fraction (F3) and the fourth fraction, |
| XS(F4) | is the calculated xylene cold soluble (XCS) content [in wt.-%] of the fourth fraction (F4). |

Calculation of Melt Flow Rate $MFR_2$ (230° C.) of the Fourth Fraction (F4):

$$MFR(F4) = 10^{\left[\frac{\log(MFR(R4)) - w(R3) \times \log(MFR(R3))}{w(F4)}\right]}$$

wherein

| w(R3) | is the weight fraction of the third reactor (R3), i.e. the mixture of the first fraction (F1), the second fraction (F2) an the third fraction (F3), |
|---|---|
| w(F4) | is the weight fraction of the fourth fraction (F4), i.e. of the polymer produced in the fourth reactor (R4), |
| MFR(R3) | is the melt flow rate $MFR_2$ (230° C.) [in g/10 min] of the product of the third reactor (R3), i.e. of the mixture of the first fraction (F1), the second fraction (F2) and the third fraction (F3), |
| MFR(R4) | is the melt flow rate $MFR_2$ (230° C.) [in g/10 min] of the product obtained in the fourth reactor (R4), i.e. the mixture of the first fraction (F1), the second fraction (F2), the third fraction (F3) and the fourth fraction (F4), |
| MFR(F4) | is the calculated melt flow rate $MFR_2$ (230° C.) [in g/10 min] of the fourth fraction (F4). |

NMR-Spectroscopy Measurements:

The $^{13}$C-NMR spectra of polypropylenes were recorded on Bruker 400 MHz spectrometer at 130° C. from samples dissolved in 1,2,4-trichlorobenzene/benzene-d6 (90/10 w/w). For the pentad analysis the assignment is done according to the methods described in literature: (T. Hayashi, Y. Inoue, R. Chüjö, and T. Asakura, Polymer 29 138-43 (1988). and Chujo R, et al, Polymer 35 339 (1994).

The NMR-measurement was used for determining the mmmm pentad concentration in a manner well known in the art.

Quantification of Comonomer Content by FTIR Spectroscopy

The comonomer content is determined by quantitative Fourier transform infrared spectroscopy (FTIR) after basic assignment calibrated via quantitative $^{13}$C nuclear magnetic resonance (NMR) spectroscopy in a manner well known in the art. Thin films are pressed to a thickness of between 100-500 m and spectra recorded in transmission mode.

Specifically, the ethylene content of a polypropylene-co-ethylene copolymer is determined using the baseline corrected peak area of the quantitative bands found at 720-722 and 730-733 cm$^{-1}$. Specifically, the butene or hexene content of a polyethylene copolymer is determined using the baseline corrected peak area of the quantitative bands found at 1377-1379 cm$^{-1}$. Quantitative results are obtained based upon reference to the film thickness.

Density is measured according to ISO 1183-187. Sample preparation is done by compression moulding in accordance with ISO 1872-2:2007.

$MFR_2$ (230° C.) is measured according to ISO 1133 (230° C., 2.16 kg load).

$MFR_2$ (190° C.) is measured according to ISO 1133 (190° C., 2.16 kg load).

Intrinsic viscosity is measured according to DIN ISO 1628/1, October 1999 (in Decalin at 135° C.).

Xylene cold soluble fraction (XCS wt.-%): Content of xylene cold solubles (XCS) is determined at 25° C. according ISO 16152; first edition; 2005 Jul. 1. The part which remains insoluble is the xylene cold insoluble (XCI) fraction.

Melting temperature $T_m$, crystallization temperature $T_c$, is measured with Mettler TA820 differential scanning calorimetry (DSC) on 5-10 mg samples. Both crystallization and melting curves were obtained during 10° C./min cooling and heating scans between 30° C. and 225° C. Melting and crystallization temperatures were taken as the peaks of endotherms and exotherms.

Also the melt- and crystallization enthalpy (Hm and Hc) were measured by the DSC method according to ISO 11357-1.

Number average molecular weight ($M_n$), weight average molecular weight ($M_w$) and molecular weight distribution (MWD) are determined by Gel Permeation Chromatography (GPC) according to the following method:

The weight average molecular weight Mw and the molecular weight distribution (MWD=Mw/Mn wherein Mn is the number average molecular weight and Mw is the weight average molecular weight) is measured by a method based on ISO 16014-1:2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert butyl-4-methyl-phenol) as solvent at 145° C. and at a constant flow rate of 1 mL/min. 216.5 µL of sample solution were injected per analysis. The column set was calibrated using relative calibration with 19 narrow MWD polystyrene (PS) standards in the range of 0.5 kg/mol to 11 500 kg/mol and a set of well characterized broad polypropylene standards. All samples were prepared by dissolving 5-10 mg of polymer in 10 mL (at 160° C.) of stabilized TCB (same as mobile phase) and keeping for 3 hours with continuous shaking prior sampling in into the GPC instrument.

Median particle size $d_{50}$ (Sedimentation) is calculated from the particle size distribution [mass percent] as determined by gravitational liquid sedimentation according to ISO 13317-3 (Sedigraph).

Tensile Modulus; Tensile strain at break were measured according to ISO 527-2 (cross head speed=50 mm/min; 23° C.) using injection molded specimens as described in EN ISO 1873-2 (dog bone shape, 4 mm thickness).

Flexural modulus was measured according to ISO 178 using injection molded test specimen as described in EN ISO 1873-2 with dimensions of 80×10×4 mm³. Crosshead speed was 2 mm/min for determining the flexural modulus.

Charpy impact test: The Charpy notched impact strength (Charpy NIS) is measured according to ISO 179-1/1 eA/DIN 53453 at 23° C., −20° C. and −30° C., using injection molded bar test specimens of 80×10×4 mm³ mm³ prepared in accordance with ISO 294-1:1996.

Shrinkage (SH) radial; Shrinkage (SH) tangential were determined on centre gated, injection moulded circular disks (diameter 180 mm, thickness 3 mm, having a flow angle of 355° and a cut out of 5°). Two specimens are moulded applying two different holding pressure times (10 s and 20 s respectively). The melt temperature at the gate is 260° C., and the average flow front velocity in the mould 100 mm/s. Tool temperature: 40° C., back pressure: 600 bar.

After conditioning the specimen at room temperature for 96 hours the dimensional changes radial and tangential to the flow direction are measured for both disks. The average of respective values from both disks are reported as final results.

Cutoff particle size $d_{95}$ (Sedimentation) is calculated from the particle size distribution [mass percent] as determined by gravitational liquid sedimentation according to ISO 13317-3 (Sedigraph).

2. Examples

All polymers were produced in a Borstar pilot plant with a prepolymerization reactor, one slurry loop reactor and three gas phase reactors. The catalyst used in the polymerization process for the inventive example was the commercially available BCF55P catalyst (1.9 wt.-% Ti-Ziegler-Natta-catalyst as described in EP 591 224) of Borealis AG with triethylaluminium (TEAL) as cocatalyst and diethylaminotriethoxysilane [Si(OCH$_2$CH$_3$)$_3$(N(CH$_2$CH$_3$)$_2$)] (U donor) or dicyclo pentyl dimethoxy silane (D-donor). The preparation of the heterophasic propylene copolymer (HECO) comprising the propylene homopolymer (HPP) and the elastomeric propylene-ethylene copolymer (E) including the aluminium to donor ratio is described in the following Table 1. Table 1 also outlines the preparation conditions for the comparative examples (CE).

Table 2 summarizes the property profiles of the inventive heterophasic propylene copolymers (HECO) and the comparative examples (CE).

TABLE 1

Polymerization conditions of the inventive heterophasic propylene copolymers (HECO) and comparative examples (CE)

|  |  | HECO1 | HECO2 | HECO3 | HECO4 | CE1 | CE2 | CE3 | CE4 |
|---|---|---|---|---|---|---|---|---|---|
| Donor |  | D | D | D | D | D | D | D | U |
| TEAL/D | [mol/mol] | 10 | 10 | 10 | 10 | 10 | 13 | 13 | 11 |
| Matrix |  |  |  |  |  |  |  |  |  |
| split | [wt.-%] | 59 | 61 | 63 | 63 | 61 | 63 | 67 | 66 |
| MFR$_2$ | [g/10 min] | 162 | 162 | 162 | 163 | 63 | 113 | 77 | 300 |
| E |  |  |  |  |  |  |  |  |  |
| Split | [wt.-%] | 41 | 39 | 37 | 37 | 39 | 37 | 33 | 34 |
| H2/C3 ratio | [mol/kmol] | 200 | 200 | 200 | 200 | 140 | 140 | 140 | 36/152* |
| C2/C3 ratio | [mol/kmol] | 300 | 300 | 300 | 300/150* | 155 | 155 | 555 | 440 |

*bimodal

TABLE 2

Properties of the heterophasic propylene copolymers (HECO) and the comparative examples (CE)

| Example |  | HECO1 | HECO2 | HECO3 | HECO4 | CE1 | CE2 | CE3 | CE4 |
|---|---|---|---|---|---|---|---|---|---|
| Matrix | [wt.-%] | 65 | 67 | 68 | 69 | 65 | 63 | 72 | 63 |
| MFR$_2$ Matrix | [g/10 min] | 162 | 162 | 162 | 163 | 63 | 113 | 77 | 300 |
| XCS | [wt.-%] | 35 | 33 | 32 | 31 | 35 | 37 | 28 | 37 |

TABLE 2-continued

Properties of the heterophasic propylene copolymers (HECO) and the comparative examples (CE)

| Example | | HECO1 | HECO2 | HECO3 | HECO4 | CE1 | CE2 | CE3 | CE4 |
|---|---|---|---|---|---|---|---|---|---|
| IV (XCS) | [dl/g] | 2.9 | 2.9 | 3.0 | 2.5 | 3.1 | 3.3 | 3.3 | 3.0 |
| C2 (XCS) | [wt %] | 32 | 32 | 32 | 27.5 | 40 | 41 | 41 | 47 |
| $MFR_{2total}$ | [g/10 min] | 23 | 25 | 26 | 22 | 13 | 18 | 21 | 30 |
| C2 total | [wt %] | 13 | 12 | 11 | 9.3 | 15 | 15.7 | nd | 20.1 |
| Tensile modulus | [MPa] | 813 | 953 | 1010 | 903 | 856 | 844 | 1203 | 760 |
| Tensile strain at break | [%] | 312 | 287 | 192 | 316 | 221 | 67 | 46 | 14 |
| Charpy NIS +23° C. | [kJ/m²] | 67 | 64 | 59 | 63 | 69 | 68 | 16.2 | 52 |
| Charpy NIS −20° C. | [kJ/m²] | 13.6 | 10.3 | 9.3 | 8.4 | 13.5 | 15.3 | 6.8 | 13.4 |
| SH radial | [%] | 1.50 | 1.57 | 1.60 | 1.60 | 1.55 | 1.54 | 1.65 | 1.66 |
| SH tangential | [%] | 1.32 | 1.41 | 1.45 | 1.43 | 1.33 | 1.38 | 1.52 | 1.48 | nd: not determiner
: values were calculated

In contrast to the comparative examples, the inventive materials HECO1, HECO2, HECO3 and HECO4 provide an excellent combination of mechanical properties. In particular, it can be gathered that the inventive heterophasic propylene copolymers (HECO) provide good flowability in combination with good stiffness/toughness balance and excellent tensile strain at break.

What is claimed is:

1. A heterophasic propylene copolymer (HECO) comprising
   a) a propylene homopolymer (HPP) having a melt flow rate $MFR_2$ (230° C.) measured according to ISO 1133 in the range of 100 to 300 g/10 min, and
   b) an elastomeric propylene-ethylene copolymer (E),
   wherein the heterophasic propylene copolymer (HECO)
   (i) has a melt flow rate $MFR_2$ (230° C.) measured according to ISO 1133 in the range of 20 to 35 g/10 min,
   (ii) comprises a xylene cold soluble (XCS) fraction in an amount from 28 to 38 wt.-%, based on the total weight of the heterophasic propylene copolymer (HECO),
   wherein further the xylene cold soluble (XCS) fraction of the heterophasic propylene copolymer (HECO) has
   (iii) an intrinsic viscosity (IV) in the range of 2.5 to 3.5 dl/g, and
   (iv) an ethylene content (EC) of 15 to 35 wt.-% based on the total weight of the xylene cold soluble (XCS) fraction of the heterophasic propylene copolymer (HECO).

2. The heterophasic propylene copolymer (HECO) according to claim 1, wherein the propylene homopolymer (HPP) is unimodal with respect to the melt flow rate $MFR_2$ (230° C.) measured according to ISO 1133, has a xylene cold soluble (XCS) content no higher than 5 wt.-%, or is unimodal with respect to the melt flow rate $MFR_2$ (230° C.) measured according to ISO 1133 and has a xylene cold soluble (XCS) content no higher than 5 wt.-%.

3. The heterophasic propylene copolymer (HECO) according to claim 1, wherein the heterophasic propylene copolymer (HECO) has an ethylene content (EC-HECO) of 7 to 15 wt.-%, based on the total weight of the heterophasic propylene copolymer (HECO).

4. The heterophasic propylene copolymer (HECO) according to claim 1, wherein the xylene cold soluble (XCS) fraction is unimodal with respect to the ethylene content (EC), unimodal with respect to a molecular weight distribution (MWD), or unimodal with respect to the ethylene content (EC) and with respect to the molecular weight distribution (MWD).

5. The heterophasic propylene copolymer (HECO) according to claim 1, wherein the weight ratio of heterophasic propylene copolymer (HECO) to the polypropylene homopolymer (HPP) [HECO/HPP] is from 3.0:1.0 to 1.0:1.0.

6. The heterophasic propylene copolymer (HECO) according to claim 1, wherein the heterophasic propylene copolymer (HECO) is α-nucleated.

7. A polyolefin composition (PO) comprising ≥95 wt.-%, based on the total weight of the composition, of the heterophasic propylene copolymer (HECO) according to claim 1.

8. The polyolefin composition (PO) according to claim 7, wherein the composition comprises an inorganic filler (F).

9. The polyolefin composition (PO) according to claim 7, wherein the composition has
   i) a melt flow rate $MFR_2$ (230° C.) measured according to ISO 1133 in the range of 20 to 35 g/10 min, and one or more of:
   ii) a tensile modulus of ≥750 MPa, or
   iii) a Charpy Notched impact strength at 23° C. of ≥30 kJ/m2, or
   iv) a tensile strain at break of ≥150%.

10. The polyolefin composition (PO) according to claim 9, wherein the composition has one or more of:
    i) a tensile modulus in the range of 750 to 1100 MPa, or
    ii) a Charpy Notched impact strength at 23° C. in the range of 30 to 80 kJ/m2, or
    iii) a tensile strain at break in the range of 150 to 400%.

11. An automotive article comprising at least one of a heterophasic propylene copolymer (HECO) and a polyolefin composition (PO),
    wherein the heterophasic propylene copolymer (HECO) comprises
    a) a propylene homopolymer (HPP) having a melt flow rate $MFR_2$ (230° C.) measured according to ISO 1133 in the range of 100 to 300 g/10 min, and
    b) an elastomeric propylene-ethylene copolymer (E),
    wherein the heterophasic propylene copolymer (HECO)
    (i) has a melt flow rate $MFR_2$ (230° C.) measured according to ISO 1133 in the range of 20 to 35 g/10 min, (ii) comprises a xylene cold soluble (XCS) fraction in an amount from 28 to 38 wt.-%, based on the total weight of the heterophasic propylene copolymer (HECO), wherein further the xylene cold soluble (XCS) fraction of the heterophasic propylene copolymer (HECO) has (iii) an intrinsic viscosity (IV) in the range of 2.5 to 3.5 dl/g, and (iv) an ethylene content (EC) of 15 to 35 wt.-% based on the total weight of the xylene cold soluble (XCS) fraction of the heterophasic propylene copolymer (HECO), and wherein the polyolefin composition (PO) comprises ≥95 wt.-%, based on the total weight of the polyolefin composition (PO) of the heterophasic propylene copolymer (HECO).

12. The automotive article according to claim 11, wherein the automotive article is an exterior or interior automotive article selected from bumpers, body panels, rocker panels, side trim panels, interior trims, step assists, spoilers, fenders and dash boards.

13. A process for the preparation of a polyolefin composition (PO) according to claim 7, the process comprising extruding the heterophasic propylene copolymer (HECO) and the optional inorganic filler (F) in an extruder.

14. The process according to claim 13, wherein the heterophasic propylene copolymer (HECO) is obtained by producing the propylene homopolymer (HPP) in at least one reactor, transferring said propylene homopolymer (HPP) in at least one subsequent reactor, and producing the elastomeric propylene-ethylene copolymer (E) in the presence of the propylene homopolymer (HPP).

15. A method comprising improving the mechanical properties of a polyolefin composition (PO) with the heterophasic propylene copolymer (HECO) according to claim 1, wherein the improvement is achieved when the composition has i) a melt flow rate $MFR_2$ (230° C.) measured according to ISO 1133 in the range of 20 to 35 g/10 min, and one or more of ii) a tensile modulus of ≥750 MPa, or iii) a Charpy Notched impact strength at 23° C. of ≥30 kJ/m2, or iv) a tensile strain at break of ≥150%.

16. The heterophasic propylene copolymer (HECO) according to claim 6, wherein the heterophasic propylene copolymer (HECO) comprises a α-nucleating agent.

17. The polyolefin composition (PO) according to claim 8, wherein the inorganic filler (F) is selected from the group consisting of talc, wollastonite, mica, chalk and mixtures thereof.

18. The polyolefin composition (PO) according to claim 8, wherein the composition has i) a melt flow rate $MFR_2$ (230° C.) measured according to ISO 1133 in the range of 20 to 35 g/10 min, and one or more of:

ii) a tensile modulus of ≥750 MPa, or iii) a Charpy Notched impact strength at 23° C. of ≥30 kJ/m2, or iv) a tensile strain at break of ≥150%.

19. The polyolefin composition (PO) according to claim 18, wherein the composition has one or more of:

i) a tensile modulus in the range of 750 to 1100 MPa, or ii) a Charpy Notched impact strength at 23° C. in the range of 30 to 80 kJ/m2, or iii) a tensile strain at break in the range of 150 to 400%.

* * * * *